US011157850B2

(12) United States Patent
Harris et al.

(10) Patent No.: US 11,157,850 B2
(45) Date of Patent: Oct. 26, 2021

(54) AUTOMATED INFORMATION RETRIEVAL BASED ON SUPPLIER RISK

(71) Applicant: Coupa Software Incorporated, San Mateo, CA (US)

(72) Inventors: Scott Harris, Menlo Park, CA (US); Ahmad Sadeddin, San Francisco, CA (US); Dmitri Korobov, San Francisco, CA (US)

(73) Assignee: Coupa Software Incorporated, San Mateo, CA (US)

( * ) Notice: Subject to any disclaimer, the term of this patent is extended or adjusted under 35 U.S.C. 154(b) by 247 days.

(21) Appl. No.: 15/905,741

(22) Filed: Feb. 26, 2018

(65) Prior Publication Data

US 2019/0266533 A1 Aug. 29, 2019

(51) Int. Cl.
  *G06Q 10/06* (2012.01)
  *G06F 16/23* (2019.01)
(52) U.S. Cl.
  CPC ....... *G06Q 10/06315* (2013.01); *G06F 16/23* (2019.01); *G06Q 10/0635* (2013.01)
(58) Field of Classification Search
  CPC .......... G06Q 10/06315; G06Q 10/0635; G06F 16/23
  See application file for complete search history.

(56) References Cited

U.S. PATENT DOCUMENTS

| 2006/0229957 | A1* | 10/2006 | Broadwell | ............. | G06Q 40/00 705/35 |
| 2014/0114962 | A1* | 4/2014 | Rosenburg | ........... | G06Q 10/063 707/723 |

OTHER PUBLICATIONS

A Supply Risk Reduction Model Using Integrated Multicriteria Decision Making, Thomas J. Kull et al, 2008 (Year: 2008).*

* cited by examiner

*Primary Examiner* — Mohamed N El-Bathy
(74) *Attorney, Agent, or Firm* — Baker Botts L.L.P.

(57) ABSTRACT

Techniques are provided for automated information retrieval based on supplier risk. In an embodiment, a selection of a supplier identifier value that identifies a supplier during a supplier onboarding process in an e-procurement system is received. A digital data repository of the e-procurement system is queried to seek a data record matching the selected supplier identifier value. In response to determining that the data repository has a record matching the selected supplier identifier value, a risk score value associated with the selected supplier identifier value is identified from a dataset of risk score values that is stored in the data repository. A unique mapping table is generated that maps each supplier risk score value of one or more supplier risk score values to one or more information request identifiers, the one or more supplier risk score values including the risk score value associated with the selected supplier identifier value. A custom digital data entry form is generated that comprises one or more information request fields that are mapped to the risk score value associated with the selected supplier identifier value. The custom data entry form is transmitted to a computer associated with the supplier corresponding to the selected supplier identifier value, the custom data form prompting the supplier to take action, respond, or contribute information back to the server computer.

20 Claims, 11 Drawing Sheets ical field is computer-implemented graphical user interfaces, including linking forms or webpages of a computer-implemented application and automatically modifying workflows of programmed applications.

AUTOMATED INFORMATION RETRIEVAL BASED ON SUPPLIER RISK

FIELD OF THE DISCLOSURE

One technical field of the present disclosure is computer-implemented software systems that support digital procurement functions. Another technical field is computer-implemented graphical user interfaces, including linking forms or webpages of a computer-implemented application and automatically modifying workflows of programmed applications.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The operation of server computers and computer application programs adapted to provide electronic digital procurement (e-procurement) and spend management functions has been hampered in the past by inefficient processes to achieve entry of supplier information that is essential to complete a digital transaction. For example, a buyer associated with an enterprise, who is seeking to buy goods from a supplier and wishes to create a purchase order or requisition for the goods in an e-procurement system, may be unable to complete this operation if the supplier has not previously entered or confirmed the entry of data describing the supplier and its payment processes.

Supplier information necessary to create a complete supplier information management (SIM) record in an e-procurement system or ERP system includes more than just name and address. Examples include data relating to international compliance, banking details, tax details, status under various legal schemes such as whether the supplier is a women-owned business, and so forth. This data must be entered for all new suppliers and also maintained over time.

This data, data relating to past transactions where a particular supplier was involved, and data about the particular supplier retrieved from third party sources can be used to compute supplier health and risk score values. Supplier risk scores can represent a risk that the supplier will default on a supply transaction. Once a prospective buyer understands a general assessment of the risk associated with a supplier, a buyer wants to know specific things about the supplier in order to initiate a transaction.

In the past, this problem has been addressed by requiring the buyer, or other personnel associated with the buying enterprise, to draft and send e-mail messages, make telephone calls or initiate other manual communications to the supplier, in which the supplier is requested to connect to the e-procurement system and provide the necessary data. This approach is inefficient and error-prone.

Based on the foregoing, there is a need to automate the exchange of useful data between a buyer and supplier of a prospective transaction to improve the efficiency and accuracy of e-procurement transactions. The techniques described herein address these issues.

DETAILED DESCRIPTION

Figure 1:
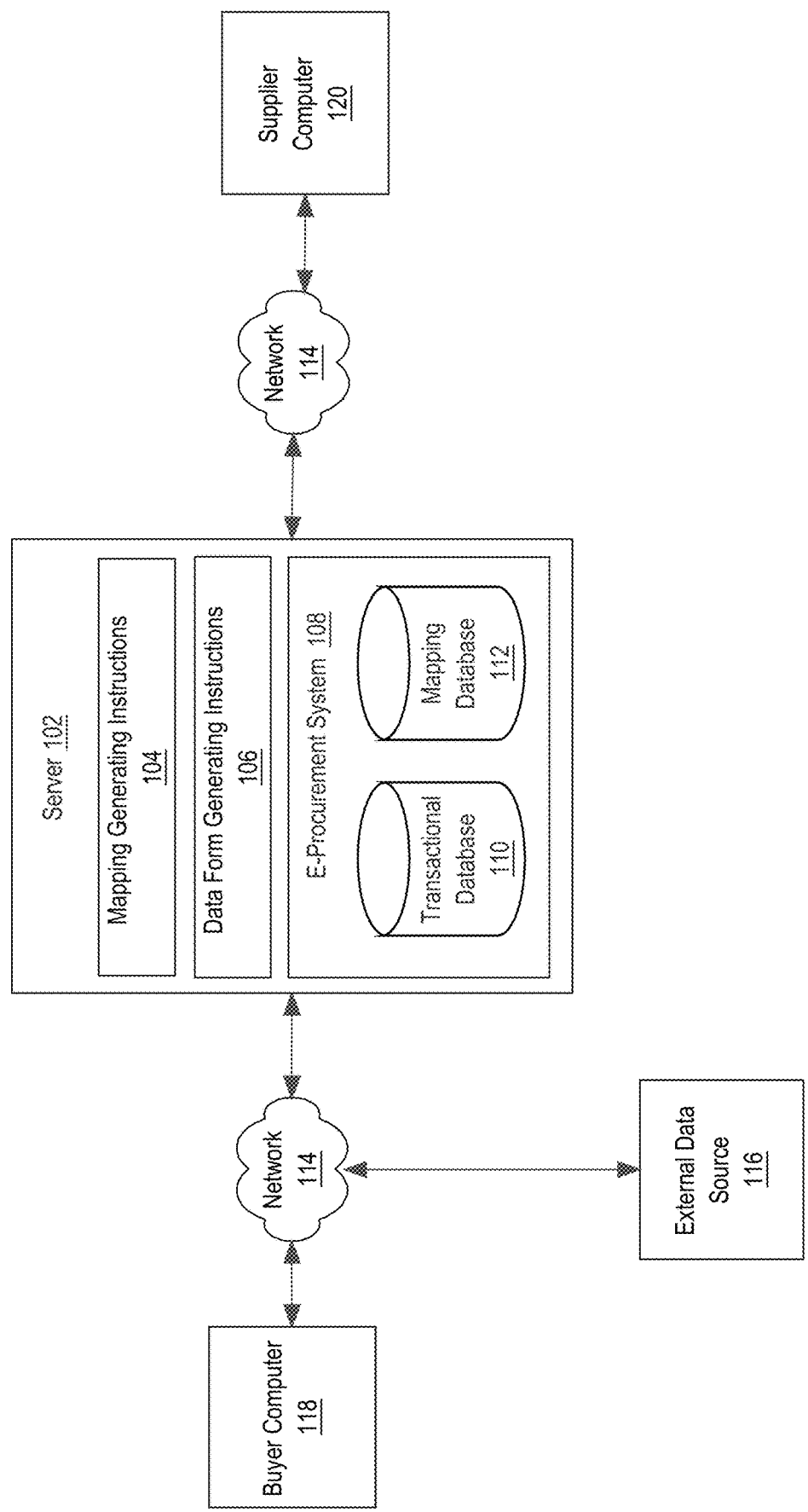
FIG. 1 illustrates an example networked computer system in which various embodiments may be practiced.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form to avoid unnecessarily obscuring the present invention.

Embodiments are described in sections according to the following outline:

1.0 GENERAL OVERVIEW
2.0 EXAMPLE NETWORKED COMPUTER SYSTEM
3.0 METHOD OVERVIEW
4.0 IMPLEMENTATION EXAMPLE—HARDWARE OVERVIEW
5.0 OTHER ASPECTS OF DISCLOSURE

1.0 GENERAL OVERVIEW

In various embodiments, methods and computer systems are provided that are programmed or configured to enable improved workflow and computing efficiency by using intelligent mappings and automated data form generation to systematize information retrieval based on supplier risk assessments. Previous approaches required manual participation of buyer agents to retrieve data regarding questions relating to supplier risk, resulting in inefficient and error prone workflows. However, the present approach uses map risk score values to information request identifiers and automatically generate and transmit custom data forms to suppliers, thereby decreasing the need for buyer agents to unnecessarily manually interact with suppliers through an e-procurement system and thus improving overall e-procurement computing system efficiency.

In an embodiment, a computer implemented method comprises a selection of a supplier identifier value that identifies a supplier during a supplier onboarding process in an e-procurement system is received. A digital data repository of the e-procurement system is queried to seek a data record matching the selected supplier identifier value. In response to determining that the data repository has a record matching the selected supplier identifier value, a risk score value associated with the selected supplier identifier value is identified from a dataset of risk score values that is stored in the data repository. A unique mapping table is generated that maps each supplier risk score value of one or more supplier risk score values to one or more information request identifiers, the one or more supplier risk score values including the risk score value associated with the selected supplier identifier value. A custom digital data entry form is generated that comprises one or more information request fields that are mapped to the risk score value associated with the selected supplier identifier value. The custom data entry form is transmitted to a computer associated with the supplier corresponding to the selected supplier identifier value, the custom data form prompting the supplier to take action, respond, or contribute information back to the server computer.

In another embodiment, a computer implemented method comprises a selection of a supplier identifier value that identifies an existing supplier in an e-procurement system is received. A digital data repository of the e-procurement system is queried to identify a risk score value associated with the selected supplier identifier value from a dataset of risk score values that is stored in the data repository. A unique mapping table is generated that maps each supplier risk score value of one or more supplier risk score values to one or more information request identifiers, the one or more supplier risk score values including the risk score value associated with the selected supplier identifier value. A custom digital data entry form is generated that comprises one or more information request fields that are mapped to the risk score value associated with the selected supplier identifier value. The custom data entry form is transmitted to a computer associated with the supplier corresponding to the selected supplier identifier value, the custom data form prompting the supplier to take action, respond, or contribute information back to the server computer.

In various embodiments, a supplier risk score value represents a risk that the supplier will default on a supply transaction and is calculated based on a plurality of data items that represent historic performance of the supplier. The supplier risk score value may represent a risk that the supplier will default on a supply transaction and is calculated based on a financial score value, a judicial score value, and a news sentiment score value. In an embodiment, the financial score value represents a rating of the supplier based upon financial indicators such as a third-party credit rating score value, a count of previous late payments, and/or a representation of whether the supplier has ever entered bankruptcy. In an embodiment, a judicial score value is based upon publicly available legal status databases and represents a number of lawsuits filed against the supplier, such as collections actions. In an embodiment, the news sentiment score value represents a sentiment value calculated by third-party sentiment calculation services based upon sentiments expressed in social media postings about the supplier. For example, the supplier may maintain a page in a third-party social networking site and customers may post comments on the page; third-party sentiment analysis software systems are called, using programmatic calls to APIs or the like, to retrieve data indicating the aggregate sentiment of such comments.

In various embodiments, the computer implemented methods may further comprise, in response to determining that the digital data repository does not include a record matching the selected supplier identifier, generating a risk score value for the selected supplier identifier and storing the risk score value in a new record in the digital data repository that matches the selected supplier identifier. The computer implemented methods may further comprise generating a unique mapping of each financial score value, judicial score value, and news sentiment score value to one or more information request identifiers, the financial score value, judicial score value, and news sentiment score value associated with the selected supplier.

2.0 EXAMPLE NETWORKED COMPUTER SYSTEM

FIG. 1 is a block diagram of an example computer network system in which various embodiments may be practiced. FIG. 1 is shown in simplified, schematic format for purposes of illustrating a clear example and other embodiments may include other elements.

In an embodiment, a networked computer system 100 comprises a server computer ("server" for short) 102, buyer computer 118, supplier computer 120, an external data source 116, which are communicatively coupled directly or indirectly via network 114.

In an embodiment, the server computer 102 executes Mapping Generating Instructions 104 and Data Form Generating Instructions 106, the functions of which are described in other sections herein. The server 102 may also execute additional code, such as code for an E-Procurement System 108. Although the Mapping Generating Instructions 104 and Data Form Generating Instructions 106 are shown in FIG. 1 as executing on the server 102 separately from the E-Procurement System 108, the Mapping Generating Instructions 104 and Data Form Generating Instructions 106 may be a part of computer instructions installed as part of the E-Procurement System 108, as a module or a plug-in to supplement features of the E-Procurement System 108, as a separate instance of executing code on the server 102 than an instance of code of the E-Procurement System 108, or any other arrangement depending on the needs of a buyer entity.

The E-Procurement System 108 may include digital data repositories such as a Transactional Database 110 managed by the E-Procurement System 108. The Transactional Database 110 may include transactional information on one or more supplier entities as well associated details on the supplier entities. The Transactional Database 110 may also include, for each supplier entity, one or more records of orders or transactions between the buyer entity and a respective supplier entity along with risk score values associated with each supplier entity.

The E-Procurement System 108 may include a Mapping Database 112 managed by the E-Procurement System 108. The Mapping Database 112 may include mapping information that maps supplier risk score values to information request identifiers.

Although the Transactional Database 110 and Mapping Database 112 are shown in FIG. 1 as encompassed by the E-Procurement System 108, the Transactional Database 110 and Mapping Database 112 may exist separately from the E-Procurement System 108 and/or server 102, and may be accessed via network 114.

Additional computing elements, code or other functional elements that are not shown in FIG. 1 may be provided by the procure E-Procurement System 108.

The server 102 is accessible over a network 114 by multiple computing devices, such as Supplier Computer 120, and Buyer Computer 118. Any other number of supplier or buyer computers may be registered with the server 102 at any given time. Thus, the elements in FIG. 1 are intended to represent one workable embodiment but are not intended to constrain or limit the number of elements that could be used in other embodiments.

Server computer 102 may be implemented using a server-class computer or other computers having one or more processor cores, co-processors, or other computers. Server computer 102 may be a physical server computer and/or a virtual server instance stored in a data center, such as through cloud computing. The server computer 102 may be programmed or configured to store transaction data and analyze the transaction data in order to generate recommendations. The server computer may comprise a plurality of communicatively coupled server computers including a server computer for storing past transaction data 104. The server computer 102 may additionally receive information that is not specific to individual transactions, such as public contact information of suppliers, website URLs for suppliers, and catalogue information for suppliers.

The External Data Source 116 may be accessed via network 114 by the server 102. The External Data Source 116 may include information relating to one or more supplier entities as well associated details on the supplier entities. The data from the External Data Source 116 may be used as input to any of the Mapping Generating Instructions 104, Data Form Generating Instructions 106, and E-Procurement System 108. Although there is one External Data Source 116 shown in FIG. 1, any other number of External Data Sources 116 may be accessed by the server at any given time.

The Mapping Generating Instructions 104 may be programmed or configured to generate mappings that associate risk score values of a supplier with information request identifiers. For example, the Mapping Generating Instructions 104 may include features to access information from the Transactional Database 110 and Mapping Database 112 managed by the E-Procurement System 108. The Mapping Generating Instructions 104 may also access the External Data Source 116 and transmit or receive data to and from the Data Form Generating Instructions 106 and E-Procurement System 108. The Mapping Generating Instructions 106 may also be used for implementing aspects of the flow diagrams that are further described herein.

The Data Form Generating Instructions 106 may be programmed or configured to generate custom digital data entry forms ("forms"). For example, the Data Form Generating Instructions 106 may include features to access information from the Transactional Database 110 and Mapping Database 112 managed by the E-Procurement system 108. The Data Form Generating Instructions 106 may also access the External Data Source 116 and transmit or receive data to and from the Mapping Generating Instructions 104 and E-Procurement System 108. The Data Form Generating Instructions 106 may also be used for implementing aspects of the flow diagrams that are further described herein.

Computer executable instructions described herein may be in machine executable code in the instruction set of a CPU and may have been compiled based upon source code written in JAVA, C, C++, OBJECTIVE-C, or any other human-readable programming language or environment, alone or in combination with scripts in JAVASCRIPT, other scripting languages and other programming source text. In another embodiment, the programmed instructions also may represent one or more files or projects of source code that are digitally stored in a mass storage device such as non-volatile RAM or disk storage, in the systems of FIG. 1 or a separate repository system, which when compiled or interpreted cause generating executable instructions which when executed cause the computer to perform the functions or operations that are described herein with reference to those instructions. In other words, the drawing figure may represent the manner in which programmers or software developers organize and arrange source code for later compilation into an executable, or interpretation into bytecode or the equivalent, for execution by the server computer 102.

Network 114 broadly represents any medium or mechanism that provides for the exchange of data between the various elements of FIG. 1. Examples of network 114 include, without limitation, a cellular network, communicatively coupled with a data connection to the computing devices over a cellular antenna, one or more Local Area Networks (LANs), one or more Wide Area Networks (WANs), one or more Ethernets or the Internet, or one or more terrestrial, satellite or wireless links, or a combination thereof. For purposes of illustrating a clear example, network 114 is shown as a single element but in practice, network 114 may comprise one or more local area networks, wide area networks, and/or internetworks. The various elements of FIG. 1 may also have direct (wired or wireless) communications links, depending upon a particular implementation.

The computing devices such as the Buyer Computer 118 and Supplier Computer 120 may comprise a desktop computer, laptop computer, tablet computer, smartphone, or any other type of computing device that allows access to the server 102. The Buyer Computer 118 may be associated with one or more buyers. The Supplier Computer 120 may be associated with one or more suppliers.

FIG. 1 depicts server computer 102 as a distinct element for the purpose of illustrating a clear example. However, in other embodiments, more or fewer server computers may accomplish the functions described herein. Additionally, server computer 102 may comprise a plurality of communicatively coupled server computers including a server computer for storing past transaction data.

3.0 METHOD OVERVIEW

Figure 4:
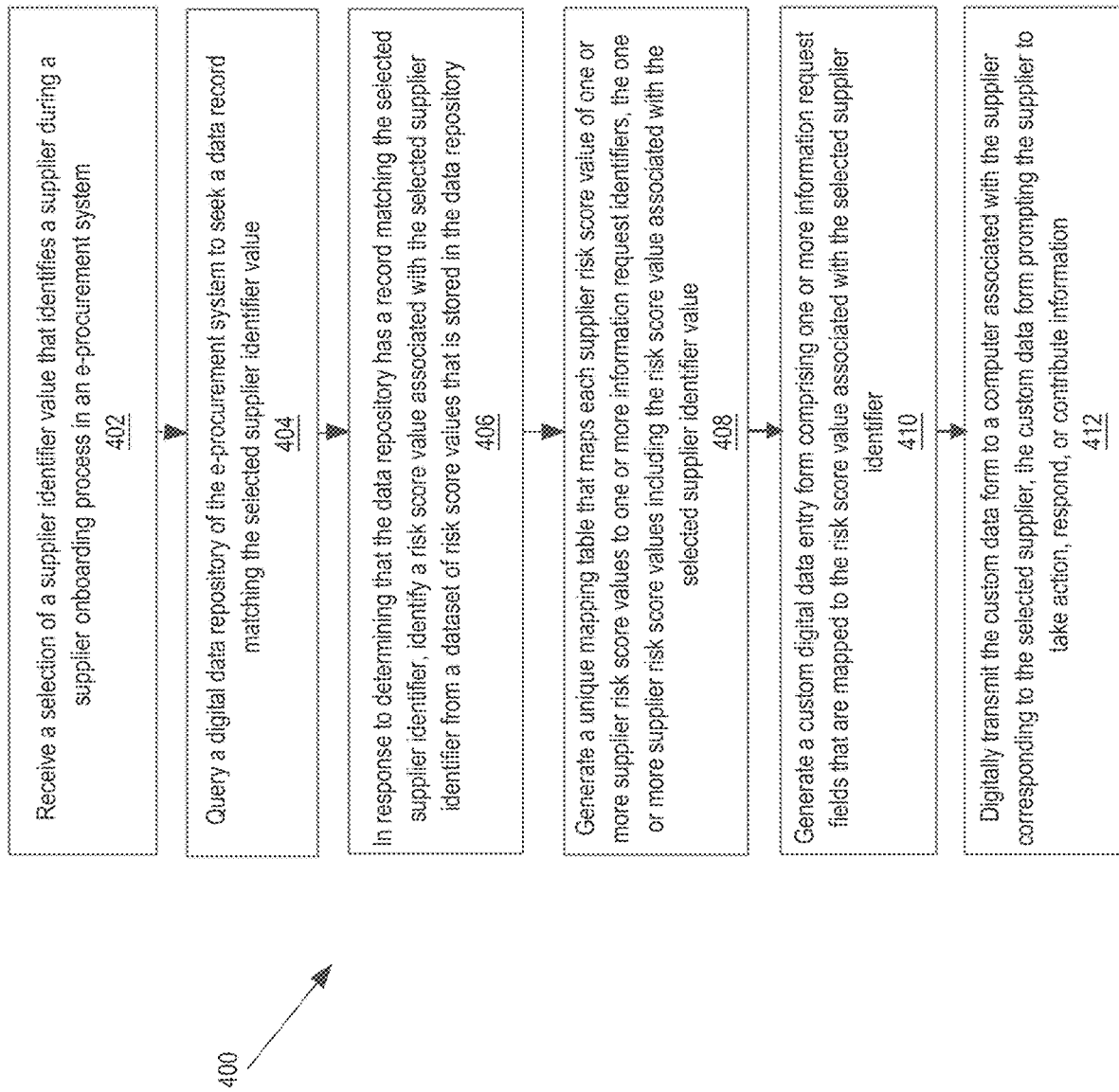
FIG. 4 illustrates an example process of providing automated information requests based on supplier risk analysis, according to various embodiments.

FIG. 4 is a flowchart of an example method of providing automated information requests based on supplier risk analysis, according to various embodiments.

For purposes of illustrating a clear example, FIG. 4 is described herein in the context of FIG. 1, but the broad principles of FIG. 4 can be applied to other systems having configurations other than as shown in FIG. 1. Further, FIG. 4 and each other flow diagram herein illustrates an algorithm or plan that may be used as a basis for programming one or more of the functional modules of FIG. 1 that relate to the functions that are illustrated in the diagram, using a programming development environment or programming language that is deemed suitable for the task. Thus, FIG. 4 and each other flow diagram herein are intended as an illustration at the functional level at which skilled persons, in the art to which this disclosure pertains, communicate with one another to describe and implement algorithms using programming. The flow diagrams are not intended to illustrate every instruction, method object or sub step that would be needed to program every aspect of a working program, but are provided at the high, functional level of illustration that is normally used at the high level of skill in this art to communicate the basis of developing working programs.

In step 402, a selection of a supplier identifier value that identifies a supplier during a supplier onboarding process in an e-procurement system is received. For example, the server 102 or e-procurement system 108 may receive a selection of a supplier identifier value from buyer computer 118.

Figure 5:
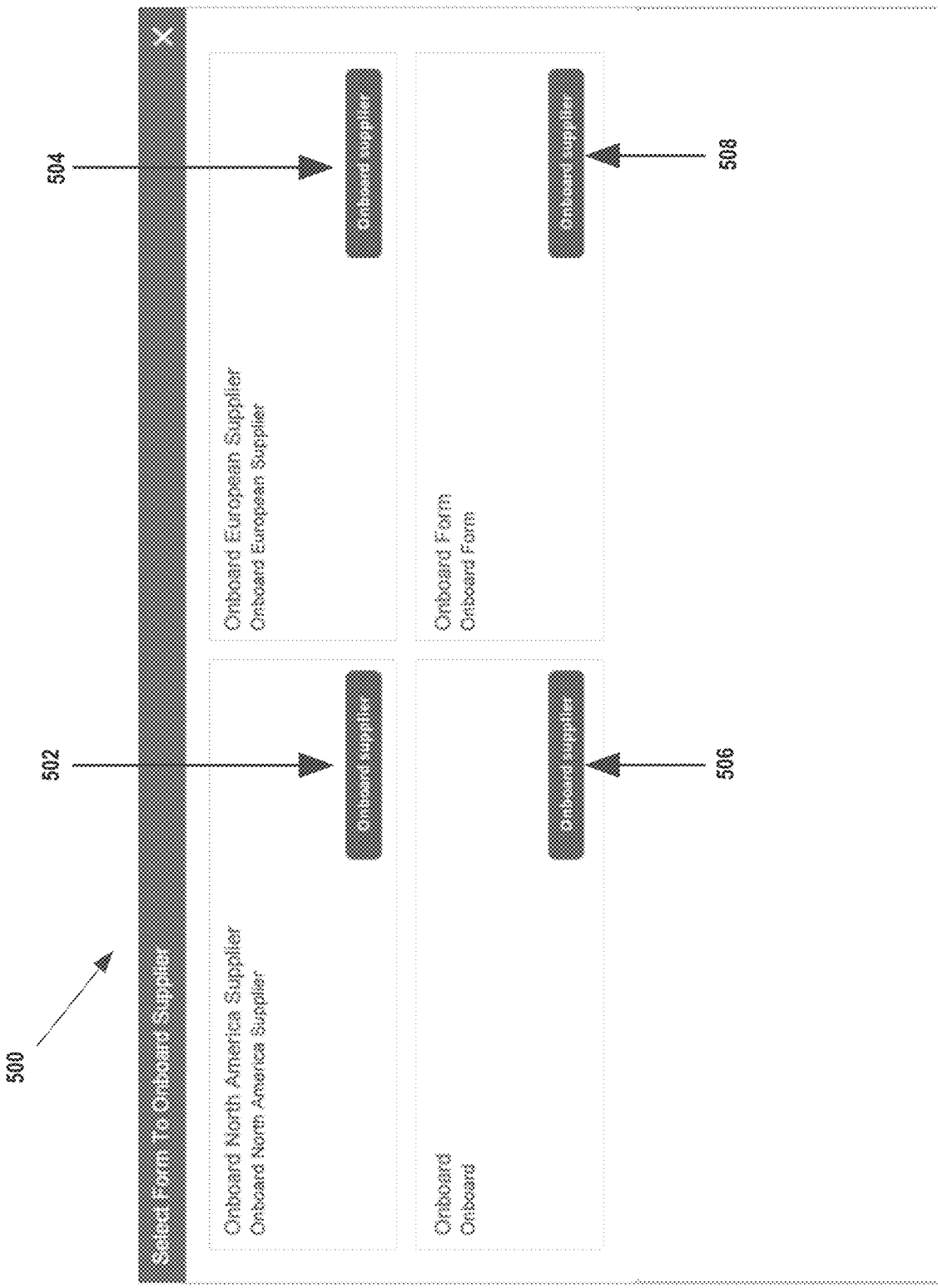
FIG. 5 illustrates an example graphical user interface (GUI) of a digital display device, which may be generated under program control using the techniques herein for selecting a type of form for onboarding a supplier.
Figure 6:
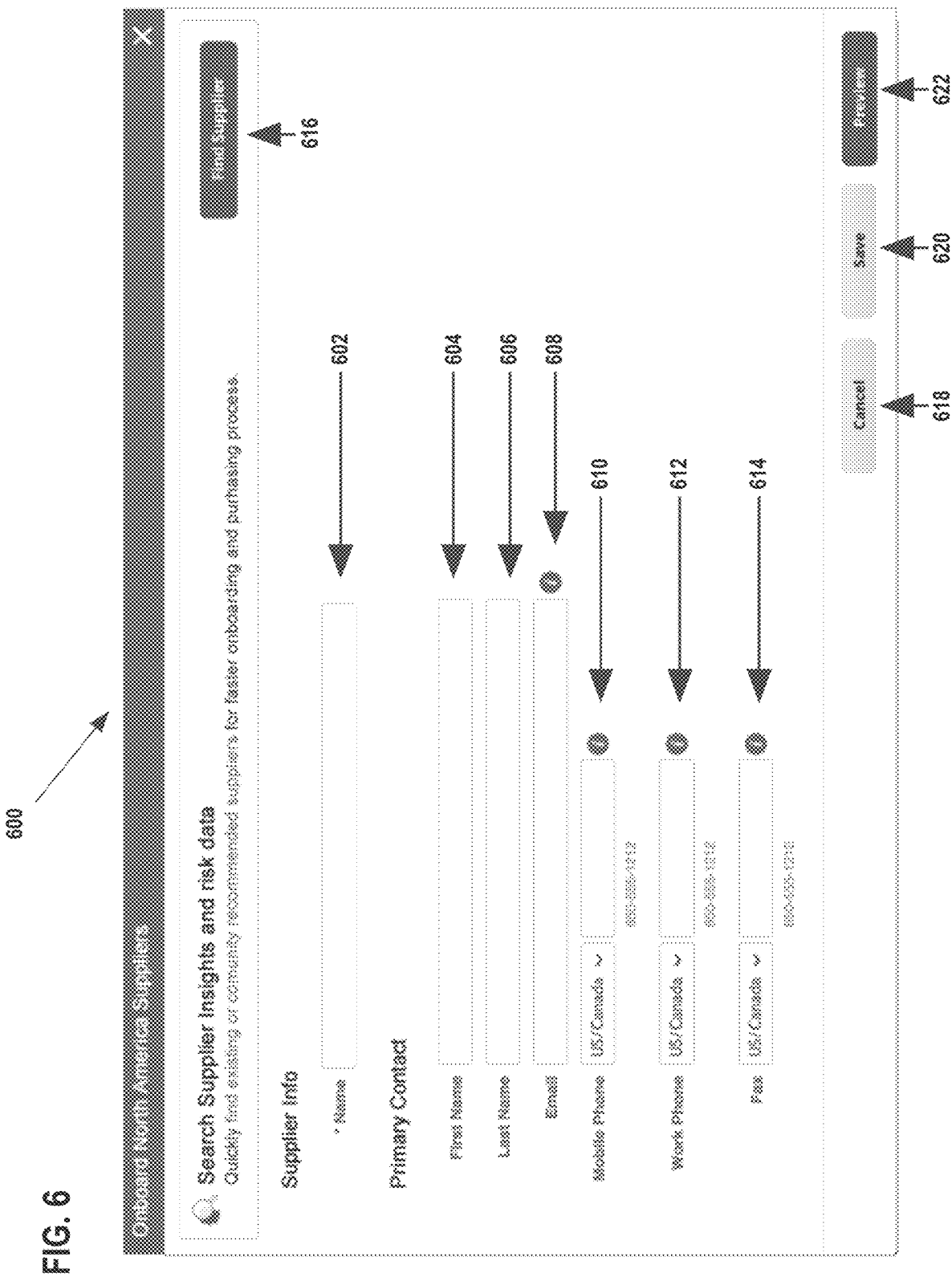
FIG. 6 illustrates an example GUI of a new supplier request form.

Referring now to FIG. 5, which illustrates an example graphical user interface (GUI) of a digital display device, which may be generated under program control using the techniques herein for selecting a type of form for onboarding a supplier, a form type may be selected to initiate the supplier onboarding process. In an embodiment, a GUI 500 comprises a plurality of hyperlinked graphical buttons 502, 504, 506, 508 that are programmed to invoke different form types. Form type selections may include selections to onboard a North American Supplier, a European Supplier, and general supplier onboarding using hyperlinked graphical buttons 502, 504, 506, 508. When a "Onboard supplier" button 502, 504, 506, 508 is selected, a supplier onboarding form is displayed, such as shown in FIG. 6. The appearance and labeling of buttons 502, 504, 506, 508 in FIG. 5 are examples and other embodiments may use functionally equivalent links or widgets having different format and labeling.

FIG. 6 illustrates a supplier onboarding form that is programmed for onboarding North America Suppliers. In an embodiment, an onboarding form 600 includes data entry fields such as the Name of a supplier 602 and primary contract data entry fields such as the First Name 604, Last Name 606, Email 608, Mobile Phone 610, Work Phone 612, and Fax 614 of the primary contact of the supplier. Each of the fields 602, 604, 606, 608, 610, 612, 614 may be programmed as a data input field using HTML forms or similar techniques. As shown in FIG. 6, data entry fields 602-614 can be manually populated to select a supplier that a buyer seeks to onboard to the e-procurement system.

In an embodiment, the supplier onboarding form of FIG. 6 includes an option 616 to Find a Supplier and includes options 618, 620 622 that are programmed to Cancel, Save, and Preview the supplier onboarding form. In an embodiment, when Find Supplier button 616 is selected, in response, a GUI for searching and selecting a supplier is displayed, as shown in FIG. 7.

Figure 7:
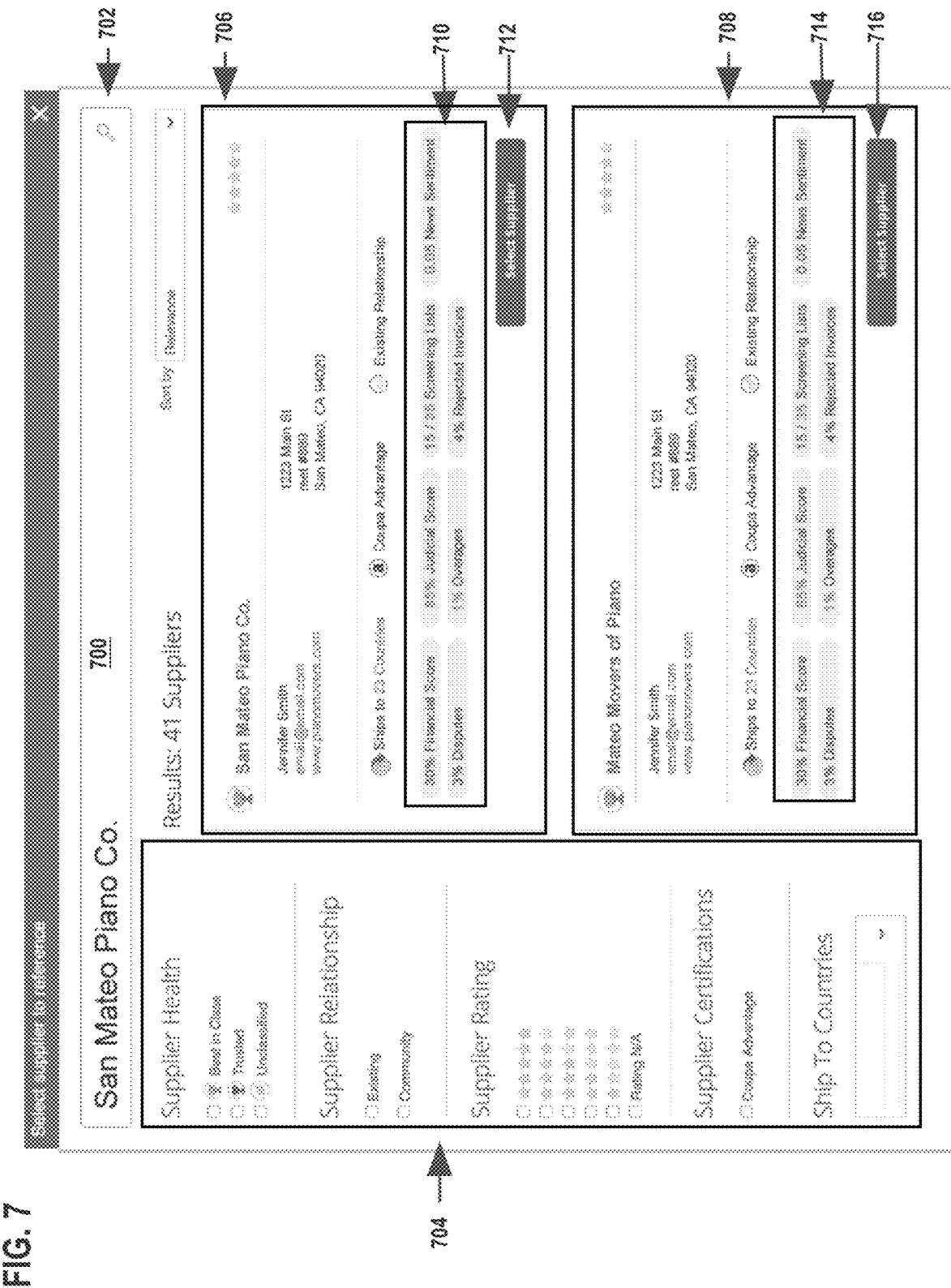
FIG. 7 illustrates an example GUI for searching and selecting a supplier during a supplier onboarding process.

FIG. 7 illustrates a GUI that is programmed to support searching and selecting a supplier during the supplier onboarding process. The GUI 700 includes a search entry field 702 that is programmed to accept search queries for searching for suppliers. In response to receiving a search query in field 702, the system is programmed to perform a database search and the GUI displays results of the search. In the example of FIG. 7, the query "San Mateo Piano Co." yielded 41 suppliers as a result, and details for two (2) results 706, 708 are shown in the sections titled "San Mateo Piano Co." and "Mateo Movers of Piano".

The GUI 700 of FIG. 7 also illustrates search filters 704 that may be selected and are programmed to cause re-displaying search results in the GUI for only those results that match the selected filters. Examples of filters include "Supplier Health", "Supplier Relationship", "Supplier Rating", "Supplier Certifications", and "Ship To Countries" that can be used to refine the results of the search. In an embodiment, the Supplier Health filter 704 may include radio buttons for selecting Best in Class, Trusted, Unclassified or other health values. In an embodiment, the Supplier Relationship filter 704 may include radio buttons for selecting a value of Existing or Community to permit filtering for suppliers that have an existing relationship to the entity of the client computer or that are within a procurement community. In an embodiment, the Supplier Rating filter 704 may include radio buttons for selecting rating values such as five stars, three stars and others. In an embodiment, the Supplier Certifications filter 704 may include radio buttons for selecting from among certifications that have been earned by one or more suppliers in the results. In an embodiment, the Ship To Countries filter 704 may comprise a drop-down menu that is programmed to display the countries to which different suppliers in the results will ship goods.

Each of the search results 706, 708 includes information relating to a respective supplier such as a supplier name, supplier address, primary contact information, supplier shipping information, and platform specific information. Each search result 706, 708 includes risk score details 710, 714 associated with the respective supplier. In an embodiment, risk score details 710, 714 comprise numeric values for one or more of, or all of, "Financial Score", "Judicial Score", "Screening Lists", "News Sentiment Score", "Disputes", "Overages", and "Rejected Invoices".

In an embodiment, the financial score value represents a rating of the supplier based upon financial indicators such as a third-party credit rating score value, a count of previous late payments, and/or a representation of whether the supplier has ever entered bankruptcy. In an embodiment, a judicial score value is based upon publicly available legal status databases and represents a number of lawsuits filed against the supplier, such as collections actions. In an embodiment, the screening lists value is calculated based on whether the supplier appears in a government list such as a sanctions list, banned importer or exporter list, or a list of suppliers that are prohibited in government contracting. In an embodiment, the news sentiment score value represents a sentiment value calculated by third-party sentiment calculation services based upon sentiments expressed in social media postings about the supplier. In an embodiment, the disputes score is based on the number of invoice disputes that a supplier has had with the client computer's entity or with a community of buyers. In an embodiment, the overages score is based on the number of overcharge disputes that a supplier has had with the client computer's entity or with a community of buyers. In an embodiment, the rejected invoices score is based on the number of rejected invoices that a supplier has had with the client computer's entity or with a community of buyers. The appearance of these score values within search results 706, 708 promotes efficiency in the onboarding of supplier data by alerting a client computer to material reasons to accept, or reject, a particular supplier. When a client computer rejects a particular supplier based upon one or more of the score values, the result is reduction in the number of network messages, storage, bandwidth and CPU resources that otherwise would be required to investigate the supplier and then reject its data. Furthermore, when a client computer accepts a particular supplier based on the score values, the client computer also avoids network messages, storage, bandwidth and CPU resources that otherwise would be required to investigate the supplier and accept its data. In the example of FIG. 7, at least six (6) network messages, responses and associated displays of data are avoided by the instant display of the score values, because otherwise the client computer would have to request and receive the individual score values or their foundation data from one or more other systems.

A supplier can be selected for onboarding by selecting one of the "Select Supplier" buttons 712, 716. In an embodiment, supplier onboarding in an e-procurement system is the process of collecting documentation and data needed to set up a company as an approved supplier and to enable buyers to efficiently conduct business, purchase goods and services, and make payments to that company.

In an embodiment, supplier onboarding is a process for a buyer to setup a new supplying organization so the buyer can efficiently send purchase orders, receive invoices, and manage contracts with the supplying organization. During onboarding, buyers need to collect information from the supplier to set them up in the e-procurement system so they can pay the supplier as well as have all the information needed for taxes, external compliance (anti-terrorism, anti-money laundering, etc.), and internal compliance (diversity programs, CSR, workers rights policies, and financial and reputation risk policies).

The features in this application help with this on many fronts, by helping the buying user find information that already exists in Coupa's community of supplier data, they can save time on finding and entering information as well as ensure that they are using information that has been vetted by another buying company. The buying company can also now, with the features in this application, directly see risk factors and screening list red flags to help them better decide whether to onboard the supplier or investigate a risk factor or red flag further.

Supplier onboarding is further described in provisional application No. 62,446,864, filed Jan. 17, 2017, the entire contents of which are incorporated by reference as if fully disclosed herein.

Referring again to FIG. 4, in step 404, a digital data repository of the e-procurement system is queried to seek a data record matching the selected supplier identifier value. For example, the server computer 102 may query the e-procurement system 108 to retrieve a data record from the transactional database 110 that matches the selected supplier identifier value.

As discussed with respect to step 402, a supplier can be selected by manually populating the supplier onboarding form as illustrated in FIG. 6 or by searching and selecting a supplier as illustrated by FIG. 7.

In step 406, in response to determining that the data repository has a record matching the selected supplier identifier, a risk score value associated with the selected supplier identifier is identified from a dataset of risk score values that is stored in the data repository. For example, the server computer 102 may determine that the data record retrieved from the query in step 404 matches the selected supplier identifier. The server may then query the e-procurement system 108 for a risk score value associated with the selected supplier identifier.

As discussed with respect to steps 402 and 404, when a supplier is selected by manually populating the supplier onboarding form as illustrated by FIG. 6, the selected supplier is matched to a record from the e-procurement system. Alternatively, as discussed herein, the GUI of FIG. 7 may be used to select a supplier during the supplier onboarding process that matches a record from the e-procurement system.

Figure 8:
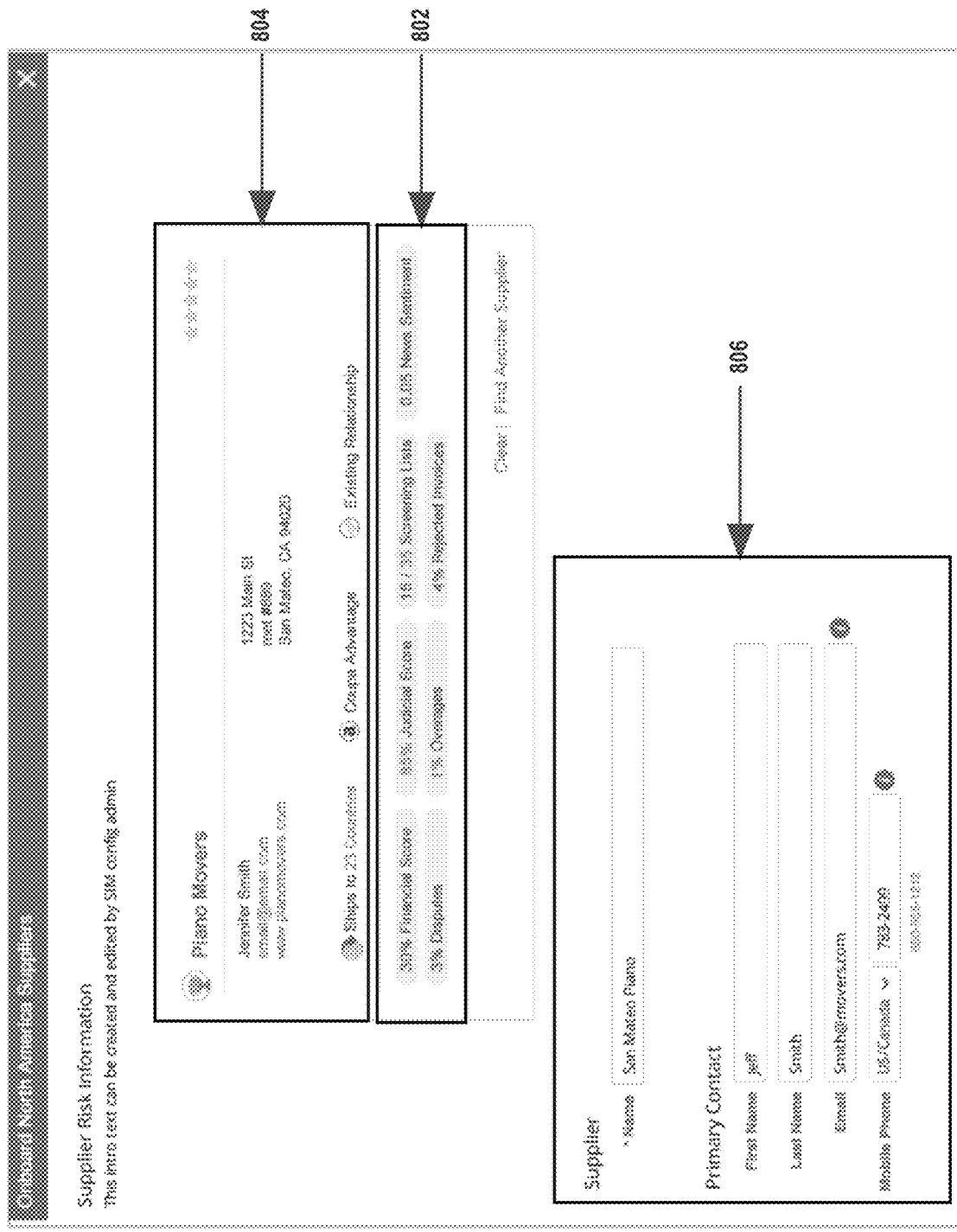
FIG. 8 illustrates an example GUI for displaying risk score data and supplier details during a supplier onboarding process.

When a record is found in the e-procurement system that matches the selected supplier, a risk score associated with the selected supplier is displayed. FIG. 8 illustrates an example GUI for displaying risk score data and supplier details during a supplier onboarding process. As shown in the example of FIG. 8, risk score details 802 and known supplier details 804 are displayed to the buyer computer during the supplier onboarding process above the supplier onboarding form 806. The supplier onboarding form may be the same onboarding form as discussed in step 402 with respect to FIG. 6. The known supplier details 804 include details such as the professional name of the company, the website of the supplier, primary contact information, star rating. basic shipping data, and e-procurement platform related information. The risk score details 802 include risk score components such as: "Financial Score", "Judicial Score", "Screening Lists", "News Sentiment Score", "Disputes", "Overages", and "Rejected Invoices".

Risk score values may be utilized to provide a risk assessment of a particular supplier. One use of risk score values in the e-procurement context is further described in U.S. application Ser. No. 15/683,689, filed Aug. 22, 2017, the entire contents of which are incorporated by reference as if fully disclosed herein.

In an embodiment, a matching record may include an exact match or a normalized match. For example, a particular supplier can be represented in the e-procurement system as multiple different vendors, wherein each vendor associated with a different supplier identifier value. When supplier identifier values differ, the server computer may use different techniques to determine whether two supplier identifier values refer to the same supplier. For example, the server computer may determine whether profile data associated with each supplier identifier value matches. For example, the server will determine whether a website URL matches between the suppliers or whether other contact information, such as phone number or address, match between the suppliers.

In an embodiment, the server computer trains a machine learning tool for normalizing supplier identifiers. For example, training datasets may be generated based on prior transactions that were already identified as being associated with specific suppliers, such as through manual verification. The server computer may train the machine learning network using the training datasets which include transaction data and supplier identifiers. The server computer may then use transactions without identified suppliers as input into the machine learning model in order to identify suppliers from the transaction data.

Normalizing the supplier identifiers may generally include selecting a particular supplier identifier for a supplier and storing data with each transaction that identifies the supplier using the particular supplier identifier. For example, if R&M is selected as the normalized supplier identifier for a particular supplier, then the server computer may adjust non-matching supplier identifiers that have been identified as being associated with the particular supplier, such as M&R, to match the supplier identifier of R&M.

Selection of the identifier to which the supplier identifiers are to be normalized may be based on frequency of the identifiers and/or on specific selections of the identifiers. For example, if the supplier has a profile through a transaction management system hosted by the server computer, then the server computer may use the supplier name from the supplier profile as the normalized identifier. Additionally or alternatively, the supplier identifier for normalization may be manually selected during verification of training data for the machine learning model. Thus, the machine learning model may be configured to output normalized supplier identifiers for each of the transactions.

Supplier normalization in the digital e-procurement context is further described in U.S. application Ser. No. 15/815, 497, filed Nov. 16, 2017, the entire contents of which are incorporated by reference as if fully disclosed herein.

In an embodiment, in response to determining that the data repository does not have a record matching the selected supplier identifier, a risk score value may be generated for the selected supplier identifier value in real time, stored in association with the supplier identifier value, and displayed to the buyer during the onboarding process. Thus, the integration of risk score displays as seen in FIG. 8 to the supplier onboarding process provides distinct benefits in terms of reducing the number of mouse clicks, network messages, accesses to external systems, and other use of bandwidth, CPU, memory and storage resources as compared to not displaying that information as described herein. The display of FIG. 8 when integrated with the complete workflow described herein solves the technical problem of how to obtain all data relevant to a supplier risk assessment at the time when it is needed the most, that is, when a buyer computer or other client computer is executing steps to add a potential supplier to a system. By integrating uniquely generated risk scores to the supplier onboarding process state, this improvement assists the average buyer by aggregating necessary information components and presenting Without this improvement, the average buyer lacks enough detailed information to make an informed decision regarding purchasing and would end up spending valuable time and computing resources to search for and find the risk score information in different parts of the e-procurement system. This improvement brings risk assessments to the supplier onboarding process and provides the custom functionality to further assess a supplier with automated custom forms.

In step 408, a unique mapping table is generated in digital memory that maps each supplier risk score value of one or more supplier risk score values to one or more information request identifiers, the one or more supplier risk score values including the risk score value associated with the selected supplier identifier value. For example, the Mapping Generating Instructions 104 may generate a unique mapping table that maps supplier risk values to information request identifiers.

In some embodiments, an information request identifier comprises a textual question or statement that indicates a request for information.

Figure 2:
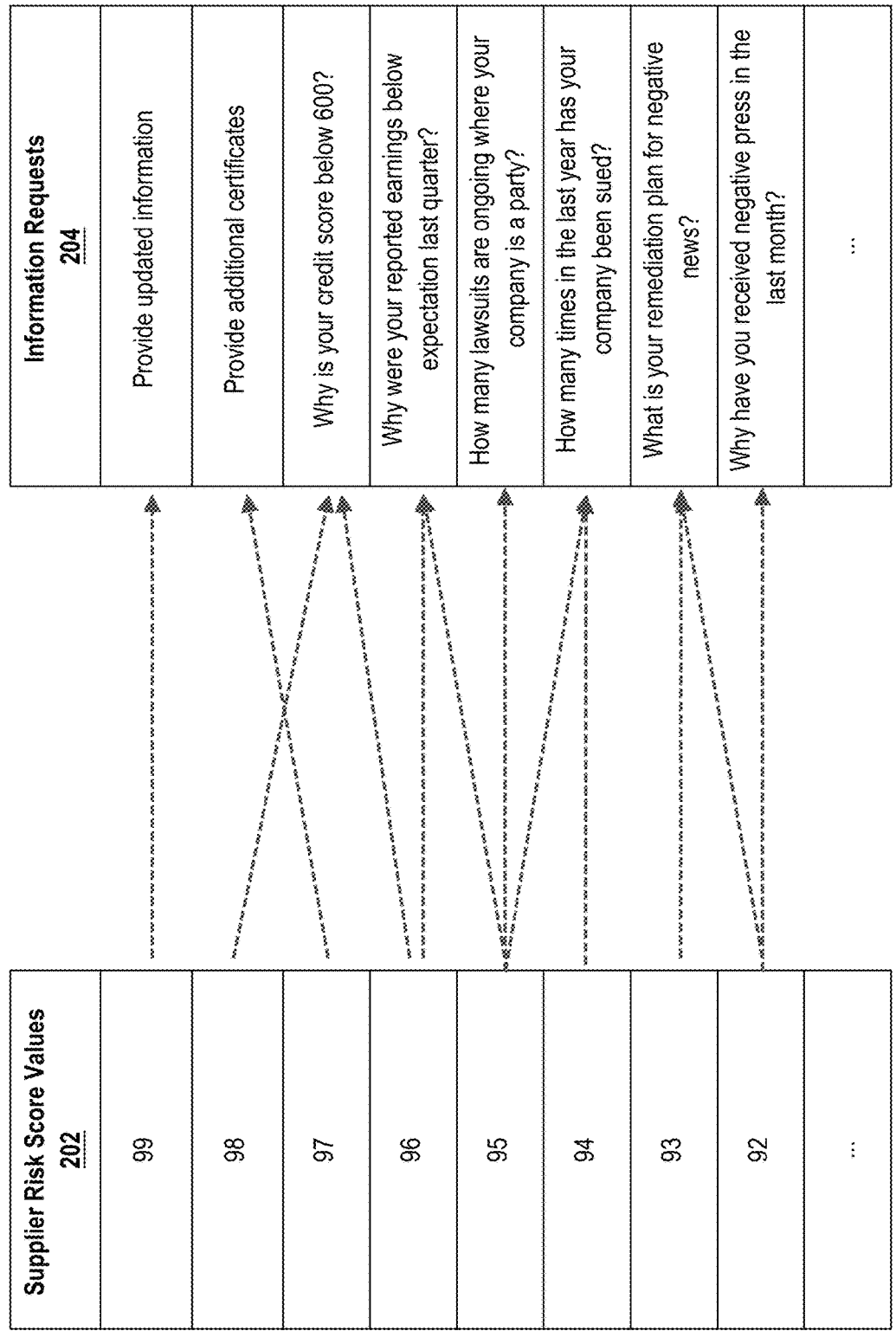
FIG. 2 illustrates a unique mapping table that maps supplier risk score values to information request identifiers.

For example, FIG. 2 illustrates a unique mapping table that maps supplier risk score values 202 to information request identifiers 204. In FIG. 2, each supplier risk score value is mapped to one or more information request identifiers. For example, risk score value '99' is mapped to information request identifier "Provide updated information". Risk score value '95' is mapped to information request identifiers: "Why were your reported earnings below expectation last quarter?", "How many lawsuits are ongoing where your company is a party?", and "How many times in the last year has your company been sued?".

In some embodiments, components of supplier risk score values are mapped to information request identifiers. For example, supplier financial score values, which are used along with judicial score values and news sentiment score values to calculate an overall risk score value, are each individually mapped to information request identifiers.

Figure 3:
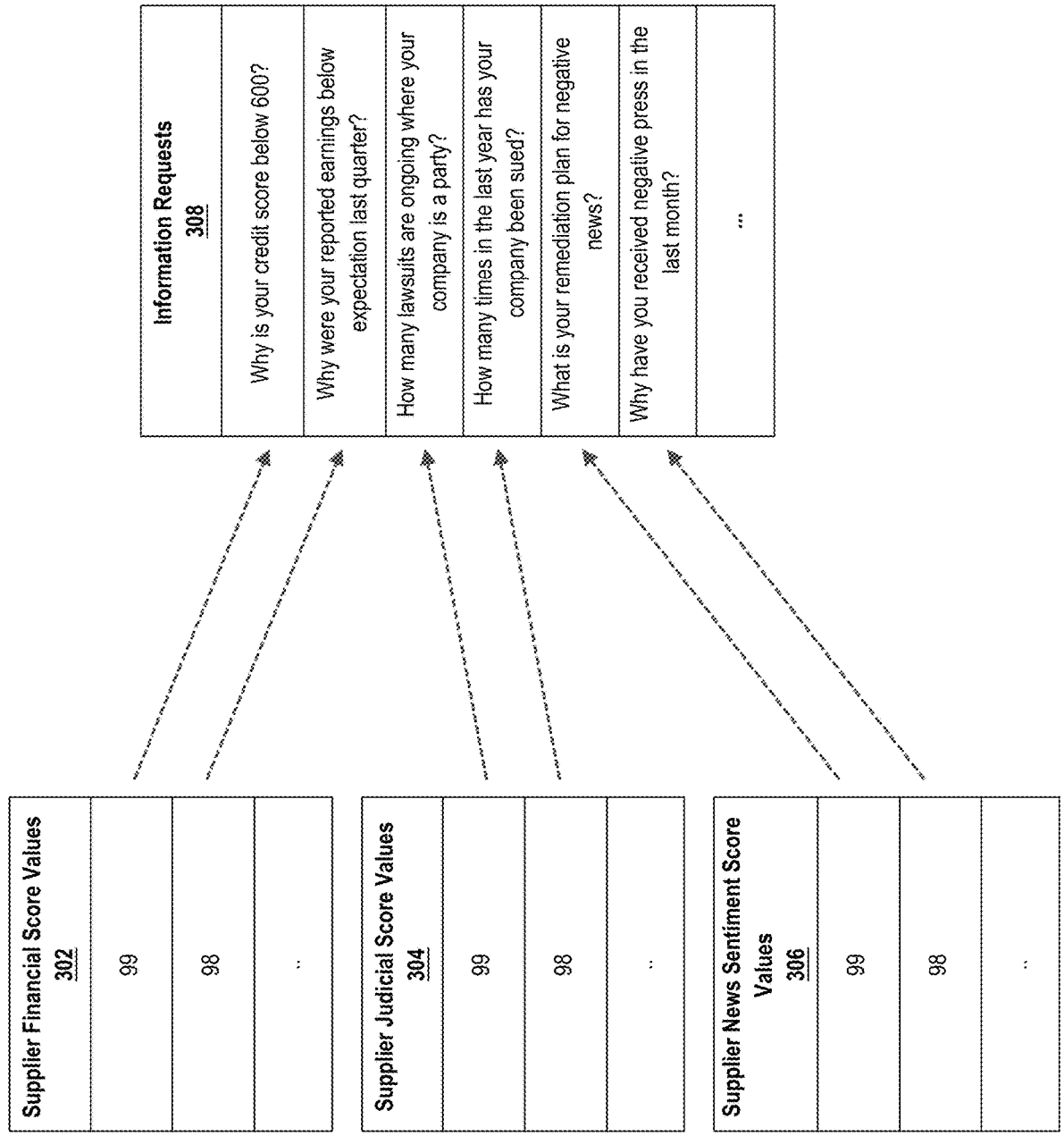
FIG. 3 illustrates a unique mapping table that maps risk score component values to information request identifiers.

For example, FIG. 3 illustrates a unique mapping table that maps risk score component values 302, 304, 306 to information request identifiers 308. Each risk score component value maps to different information request identifiers. For example, Supplier Financial Score Value '99' is mapped to information request identifier "Why is your credit score below 600?". Supplier News Sentiment Score Value '98' is mapped to information request identifier "Why have you received negative press in the last month?". In this example, risk score component categories include Supplier Financial Score Values 302, Supplier Judicial Score Values 304, and Supplier News Sentiment Score Values 306.

Referring again to FIG. 4, in step 410, a custom digital data entry form is generated comprising one or more information request fields that are mapped to the risk score value associated with the selected supplier identifier. For example, the Data Form Generating Instructions 106 may generate a custom digital data entry form by using the unique mapping table generated in step 208.

The custom digital data entry form defines what information is to be collected from the supplier. The form may vary according to the mapping generated in step 408.

In step 412, the custom data entry form is digitally transmitted to a computer associated with the supplier corresponding to the selected supplier, the custom data form prompting the supplier to take action, respond, or contribute information back to the server computer. For example, the server 102 may transmit the form to the supplier computer. Upon delivery, the form may prompt the supplier computer to process the form.

In an embodiment, the prompt can be by calendaring a to-do item, sending a text, sending a preformulated email message, leaving a preformulated phone message, or any other means. The form can be made available as an attachment, directly through a link, through access to a web site, etc. The form can then be processed and the server 102 can be programmed to be notified in various ways accordingly. For example, the server 102 can verify whether all the fields in the form have been filled out or whether the form has been edited at all within a specific time period. The server 102 can also be configured to periodically poll the recipient or consider the form processed upon receipt of a confirmation from the recipient.

Figure 10:
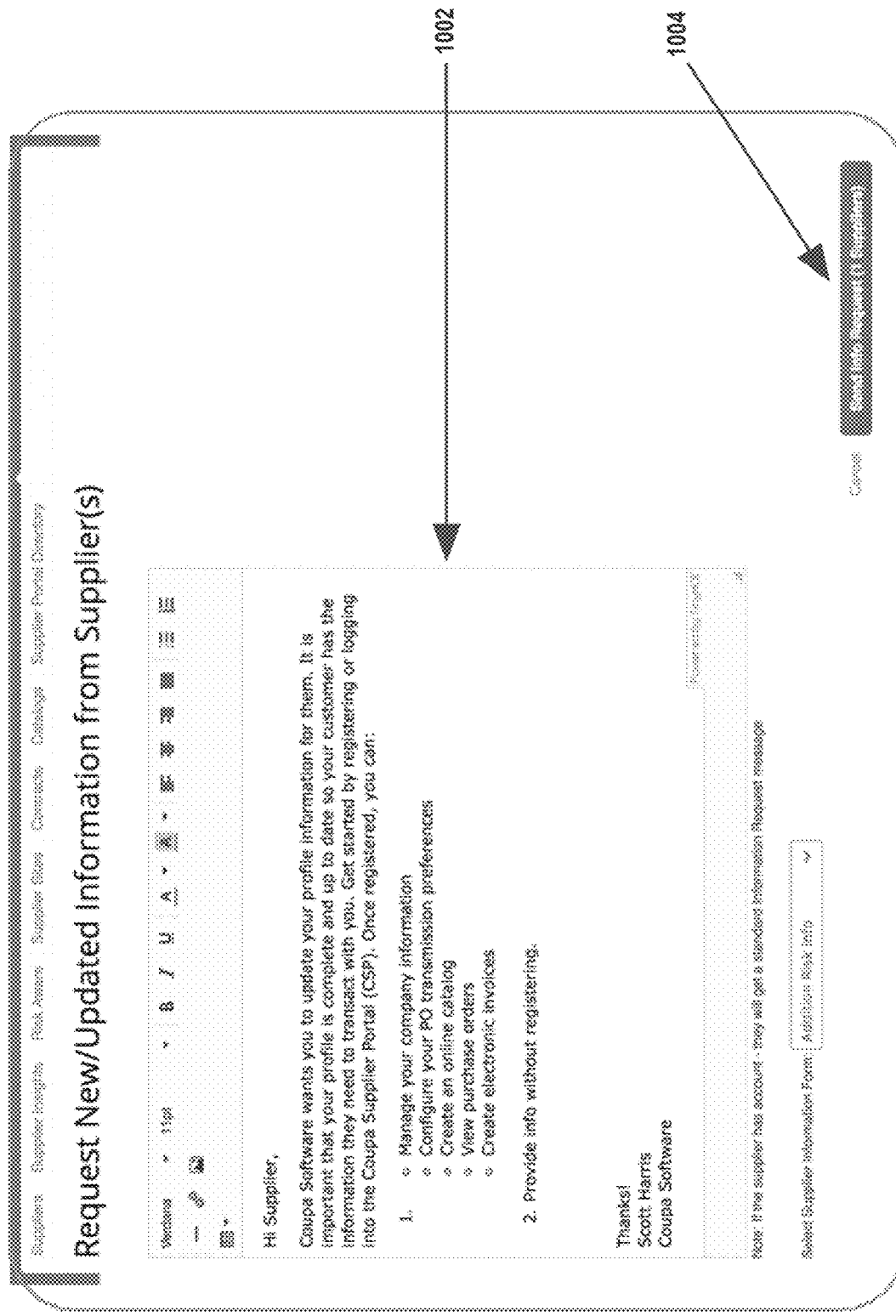
FIG. 10 illustrates an example GUI for a basic data entry form prompt in email format.

For example, FIG. 10 illustrates a basic data entry form prompt in email format. The prompt 1002 directs the supplier to update the supplier profile information on the Coupa system. When a buyer selects the Send Info Request button 1004, the data entry form prompt is transmitted to the supplier.

In one embodiment, the server causes transmitting, to a specified e-mail address of a supplier, an e-mail message containing hyperlinks that invoke operation of the e-procurement system at specified dynamic web pages or forms that are programmed to receive data from the supplier, regardless of whether the supplier logs-in or completes an authentication with the e-procurement system. For example, initiating a requisition may cause the e-procurement system to dispatch an e-mail message that contains hyperlinks acting as callbacks into the e-procurement system. When the e-mail is opened and the hyperlinks are selected, a supplier computer (separate from the buyer) receives a dynamically generated web page or form in which to enter data.

In an embodiment, the custom data entry form is transmitted as a unique hyperlink to a security sandboxed webpage. Security sandboxed webpages in context of e-procurement systems are discussed in U.S. patent application Ser. No. 14/504,721, filed Oct. 2, 2014, the entire contents of which are incorporated by reference as if fully disclosed herein.

ALTERNATIVE EMBODIMENTS

In an embodiment, once a supplier is onboarded in the e-procurement system, a buyer computer may access details associated with the supplier by browsing and exploring different suppliers through the e-procurement system. A buyer computer may also access details associated with the supplier when creating a purchase order in association with a supplier. Browsing and exploring different suppliers is discussed in U.S. application Ser. No. 15/815,497, filed Nov. 16, 2017, the entire contents of which are incorporated by reference as if fully disclosed herein.

Figure 9:
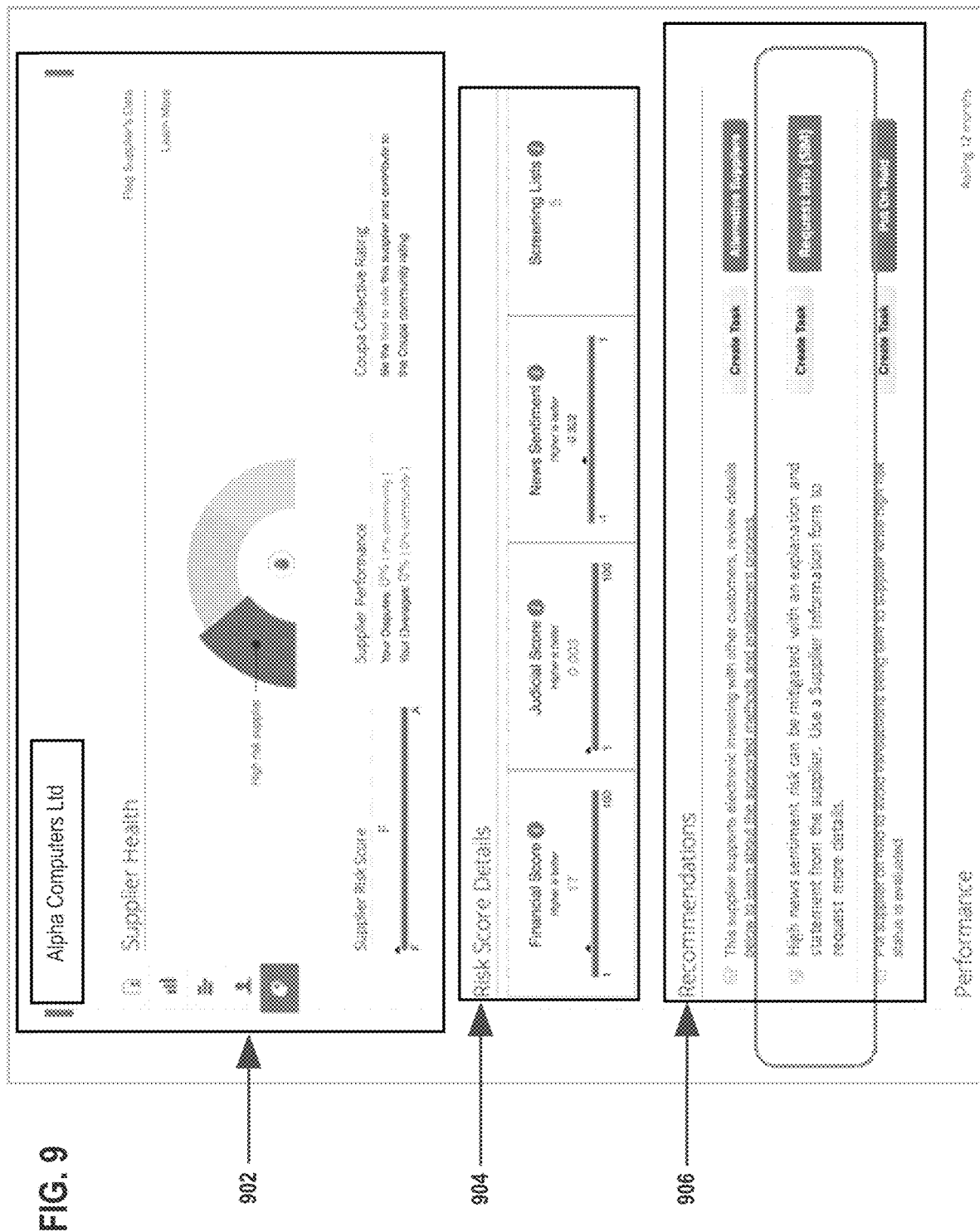
FIG. 9 illustrates an example GUI for displaying risk score data of a particular supplier entity to a buyer.

As shown in FIG. 9, if a supplier has already been onboarded to the e-procurement system, a buyer may view the supplier health information and risk score details associated with the selected supplier identifier. For example, supplier health information 902 shows a graphical representation of supplier risk. Health information includes data points such as a Supplier Health Score, Supplier Performance percentages, and a platform wide rating. Risk Score Details 904 shows risk score components such as: "Financial Score", "Judicial Score", "News Sentiment Score", "Screening Lists", and the corresponding values. Recommendations 906 shows platform recommendation options such as the option to view alternative suppliers, request information, and put the supplier on hold. By selecting the "Request Info (SIM)" button in the Recommendations 906 section, a data entry form prompt such as discussed with respect to FIG. 10 may be generated.

In an embodiment, steps 402-406 may be replaced or supplemented by the steps of: receiving, by a server computer, a selection of a supplier identifier value that identifies an existing supplier in an e-procurement system and querying, by the server computer, a digital data repository of the e-procurement system to identify a risk score value associated with the selected supplier identifier value from a dataset of risk score values that is stored in the data repository For example, if a supplier has already been onboarded into the e-procurement system, a buyer may browse different suppliers and view the risk score values associated with onboarded suppliers, as discussed herein with respect to FIG. 6.

In an embodiment, information contributed by the selected supplier in response to the transmission of the custom data form to the selected supplier is received by the server computer. In response to receiving information contributed by the selected supplier, automatically approving the selected supplier in the e-procurement system. For example, the information contributed by the selected supplier in response to the transmission of the custom data form may cause the updating of the risk score value associated with the selected supplier. If the risk score value associated with the selected supplier is above a threshold value after the updating, the selected supplier will be automatically approved in the e-procurement system.

In an embodiment, information contributed by the selected supplier in response to the transmission of the custom data form to the selected supplier is received by the server computer. In response to receiving information contributed by the selected supplier, automatically rejecting the selected supplier from being onboarded in the e-procurement system based on the risk score value associated with the selected supplier. For example, the information contributed by the selected supplier in response to the transmission of the custom data form may cause the updating of the risk score value associated with the selected supplier. If the risk score value associated with the selected supplier after the updating is below a threshold value, the selected supplier will be automatically rejected from being onboarded in the e-procurement system.

4.0 IMPLEMENTATION EXAMPLE—HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 11:
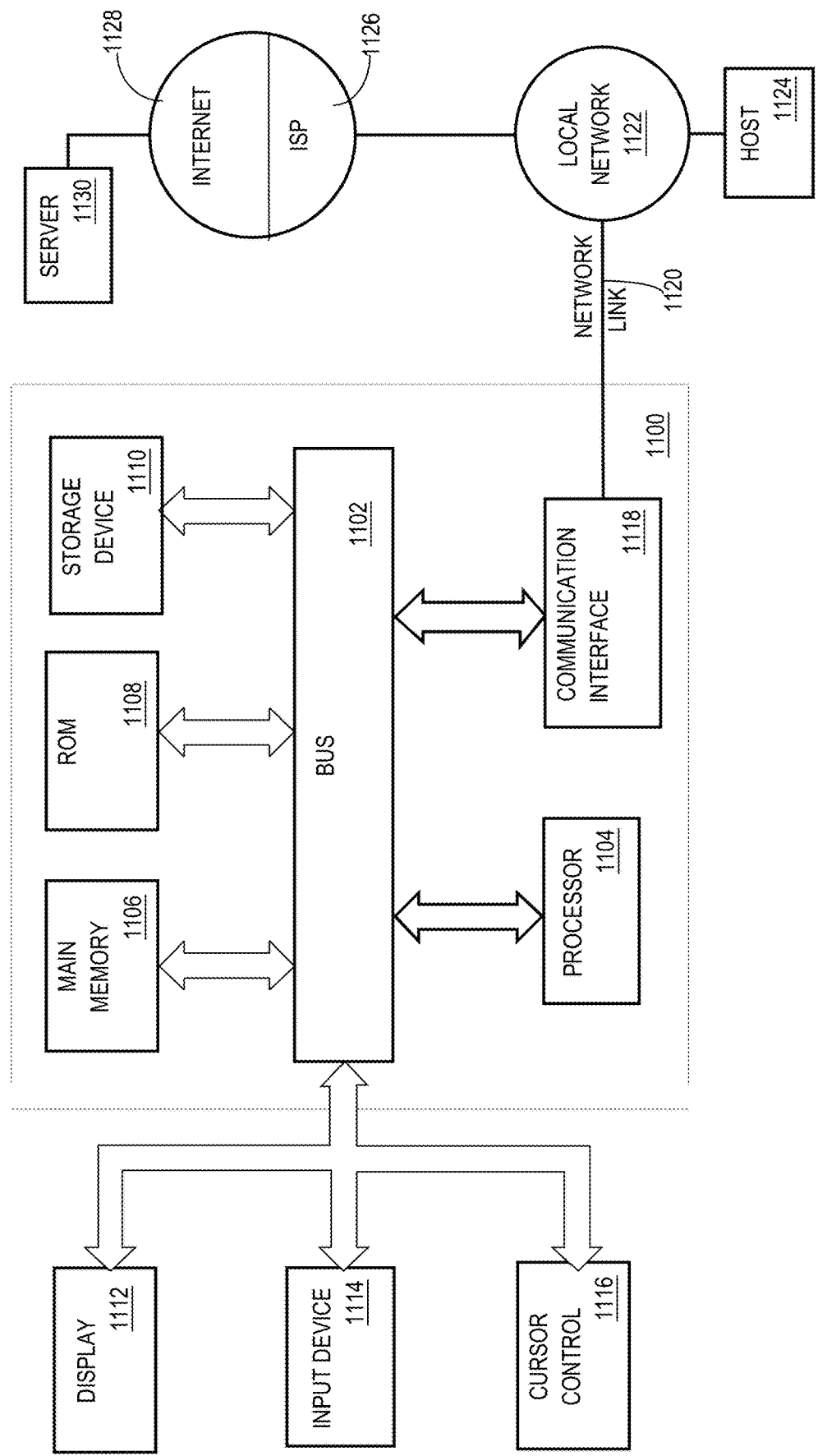
FIG. 11 illustrates a computer system upon which an embodiment of the invention may be implemented.

For example, FIG. 11 illustrates a computer system 1100 upon which an embodiment of the invention may be implemented. Computer system 1100 includes a bus 1102 or other communication mechanism for communicating information, and a hardware processor 1104 coupled with bus 1102 for processing information. Hardware processor 1104 may be, for example, a general-purpose microprocessor.

Computer system 1100 also includes a main memory 1106, such as a random-access memory (RAM) or other dynamic storage device, coupled to bus 1102 for storing information and instructions to be executed by processor 1104. Main memory 1106 also may be used for storing temporary variables or other intermediate information during execution of instructions to be executed by processor 1104. Such instructions, when stored in non-transitory storage media accessible to processor 1104, render computer system 1100 into a special-purpose machine that is customized to perform the operations specified in the instructions.

Computer system 1100 further includes a read-only memory (ROM) 1108 or other static storage device coupled to bus 1102 for storing static information and instructions for processor 1104. A storage device 1110, such as a magnetic disk or optical disk, is provided and coupled to bus 1102 for storing information and instructions.

Computer system 1100 may be coupled via bus 1102 to a display 1112, such as a cathode ray tube (CRT), for displaying information to a computer user. An input device 1114, including alphanumeric and other keys, is coupled to bus 1102 for communicating information and command selections to processor 1104. Another type of user input device is cursor control 1116, such as a mouse, a trackball, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane.

Computer system 1100 may implement the techniques described herein using customized hard-wired logic, one or more ASICs or FPGAs, firmware and/or program logic which in combination with the computer system causes or programs computer system 1100 to be a special-purpose machine. According to one embodiment, the techniques herein are performed by computer system 1100 in response to processor 1104 executing one or more sequences of one or more instructions contained in main memory 1106. Such instructions may be read into main memory 1106 from another storage medium, such as storage device 1110. Execution of the sequences of instructions contained in main memory 1106 causes processor 1104 to perform the process steps described herein. In alternative embodiments, hardwired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 1110. Volatile media includes dynamic memory, such as main memory 1106. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1102. Transmission media can also take the form of acoustic or light waves, such as those generated during radio-wave and infra-red data communications.

Various forms of media may be involved in carrying one or more sequences of one or more instructions to processor 1104 for execution. For example, the instructions may initially be carried on a magnetic disk or solid state drive of a remote computer. The remote computer can load the instructions into its dynamic memory and send the instructions over a telephone line using a modem. A modem local to computer system 1100 can receive the data on the telephone line and use an infra-red transmitter to convert the data to an infra-red signal. An infra-red detector can receive the data carried in the infra-red signal and appropriate circuitry can place the data on bus 1102. Bus 1102 carries the data to main memory 1106, from which processor 1104 retrieves and executes the instructions. The instructions received by main memory 1106 may optionally be stored on storage device 1110 either before or after execution by processor 1104.

Computer system 1100 also includes a communication interface 1118 coupled to bus 1102. Communication interface 1118 provides a two-way data communication coupling to a network link 1120 that is connected to a local network 1122. For example, communication interface 1118 may be an integrated services digital network (ISDN) card, cable modem, satellite modem, or a modem to provide a data communication connection to a corresponding type of telephone line. As another example, communication interface 1118 may be a local area network (LAN) card to provide a data communication connection to a compatible LAN. Wireless links may also be implemented. In any such implementation, communication interface 1118 sends and receives electrical, electromagnetic or optical signals that carry digital data streams representing various types of information.

Network link 1120 typically provides data communication through one or more networks to other data devices. For example, network link 1120 may provide a connection through local network 1122 to a host computer 1124 or to data equipment operated by an Internet Service Provider (ISP) 1126. ISP 1126 in turn provides data communication services through the world-wide packet data communication network now commonly referred to as the "Internet" 1128. Local network 1122 and Internet 1128 both use electrical, electromagnetic or optical signals that carry digital data streams. The signals through the various networks and the signals on network link 1120 and through communication interface 1118, which carry the digital data to and from computer system 1100, are example forms of transmission media.

Computer system 1100 can send messages and receive data, including program code, through the network(s), network link 1120 and communication interface 1118. In the Internet example, a device 1130 might transmit a requested code for an application program through Internet 1128, ISP 1126, local network 1122 and communication interface 1118.

The received code may be executed by processor 1104 as it is received, and/or stored in storage device 1110, or other non-volatile storage for later execution.

5.0 OTHER ASPECTS OF DISCLOSURE

Although some of the figures described in the foregoing specification include flow diagrams with steps that are shown in an order, the steps may be performed in any order, and are not limited to the order shown in those flowcharts. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments. In other words, each flow diagram in this disclosure, in combination with the related text herein, is a guide, plan or specification of all or part of an algorithm for programming a computer to execute the functions that are described. The level of skill in the field associated with this disclosure is known to be high, and therefore the flow diagrams and related text in this disclosure have been prepared to convey information at a level of sufficiency and detail that is normally expected in the field when skilled persons communicate among themselves with respect to programs, algorithms and their implementation.

In the foregoing specification, the example embodiment(s) of the present invention have been described with reference to numerous specific details. However, the details may vary from implementation to implementation according to the requirements of the particular implement at hand. The example embodiment(s) are, accordingly, to be regarded in an illustrative rather than a restrictive sense.

What is claimed is:

1. A computer-implemented method comprising:
receiving, by a server computer, a selection of a supplier identifier value that identifies a selected supplier during a supplier onboarding process in an e-procurement system;
querying, by the server computer, a digital data repository of the e-procurement system to seek a data record matching the selected supplier identifier value;
in response to determining that the data repository has a record matching the selected supplier identifier value, identifying a supplier risk score value associated with the selected supplier identifier value from a dataset of supplier risk score values that is stored in the data repository;
before the selected supplier is approved in the e-procurement system, generating in digital memory a unique mapping table that maps each supplier risk score value of one or more supplier risk score values to one or more information request identifiers of a plurality of information request identifiers, the one or more supplier risk score values including the supplier risk score value associated with the selected supplier identifier value, each information request identifier of the plurality of information request identifiers comprising a textual question or statement that indicates a request for information;

before the selected supplier is approved in the e-procurement system, generating, by the server computer, a custom digital data entry form comprising the one or more information request identifiers of the plurality of information request identifiers that are mapped to the supplier risk score value associated with the selected supplier identifier value in the unique mapping table;

digitally transmitting, by the server computer, to a specified e-mail address of the selected supplier, an e-mail message containing hyperlinks that invoke operation of the e-procurement system at a security sandboxed webpage, the security sandboxed webpage displaying the custom digital data entry form, the custom digital data entry form prompting the selected supplier to take action, respond, or contribute information back to the server computer;

receiving, by the server computer, information contributed by the selected supplier in response to the transmission of the e-mail message to the specified e-mail address of the selected supplier;

in response to receiving information contributed by the selected supplier, updating the supplier risk score value associated with the selected supplier identifier value based on the information contributed by the selected supplier;

in response to determining that the updated supplier risk score value associated with the selected supplier identifier value is above a threshold value, automatically approving the selected supplier in the e-procurement system;

in response to determining that the updated supplier risk score value associated with the selected supplier identifier value is below the threshold value, automatically rejecting the selected supplier from being onboarded in the e-procurement system;

wherein the method is performed by one or more computing devices.

2. The method of claim 1, further comprising: in response to determining that the digital data repository does not include a record matching the selected supplier identifier, generating a supplier risk score value for the selected supplier identifier and storing the risk score value in a new record in the digital data repository that matches the selected supplier identifier.

3. The method of claim 1, wherein a supplier risk score value represents a risk that the supplier will default on a supply transaction and is calculated based on a plurality of data items that represent historic performance of the supplier.

4. The method of claim 1, wherein the supplier risk score value represents a risk that the supplier will default on a supply transaction and is calculated based on a financial score value that represents a rating of the supplier based upon financial indicators such as a third-party credit rating score value, a count of previous late payments, and/or a representation of whether the supplier has ever entered bankruptcy, a judicial score value that represents a number of lawsuits filed against the supplier, and a news sentiment score value that represents a sentiment value calculated by third-party sentiment calculation services based upon sentiments expressed in social media postings about the supplier.

5. The method of claim 4, further comprising: generating a unique mapping of each financial score value, judicial score value, and news sentiment score value to one or more information request identifiers, the financial score value, judicial score value, and news sentiment score value associated with the selected supplier.

6. The method of claim 1, wherein a supplier risk score value represents a risk that the supplier will default on a supply transaction and is calculated based on a plurality of data items that represent historic performance of the supplier.

7. The method of claim 1, wherein the supplier risk score value represents a risk that the supplier will default on a supply transaction and is calculated based on a financial score value that represents a rating of the supplier based upon financial indicators such as a third-party credit rating score value, a count of previous late payments, and/or a representation of whether the supplier has ever entered bankruptcy, a judicial score value that represents a number of lawsuits filed against the supplier, and a news sentiment score value that represents a sentiment value calculated by third-party sentiment calculation services based upon sentiments expressed in social media postings about the supplier.

8. The method of claim 7, further comprising: generating a unique mapping of each financial score value, judicial score value, and news sentiment score value to one or more information request identifiers, the financial score value, judicial score value, and news sentiment score value associated with the selected supplier.

9. A computer-implemented method comprising:

receiving, by a server computer, a selection of a supplier identifier value that identifies an existing supplier in an e-procurement system;

querying, by the server computer, a digital data repository of the e-procurement system to identify a supplier risk score value associated with the selected supplier identifier value from a dataset of supplier risk score values that is stored in the data repository;

before the selected supplier is approved in the e-procurement system, generating in digital memory a unique mapping table that maps each supplier risk score value of one or more supplier risk score values to one or more information request identifiers of a plurality of information request identifiers, the one or more supplier risk score values including the supplier risk score value associated with the selected supplier identifier value, each information request identifier of the plurality of information request identifiers comprising a textual question or statement that indicates a request for information;

before the selected supplier is approved in the e-procurement system, generating, by the server computer, a custom digital data entry form comprising the one or more information request identifiers of the plurality of information request identifiers that are mapped to the supplier risk score value associated with the selected supplier identifier value in the unique mapping table;

digitally transmitting, by the server computer, to a specified e-mail address of the selected supplier, an e-mail message containing hyperlinks that invoke operation of the e-procurement system at a security sandboxed webpage, the security sandboxed webpage displaying the custom digital data entry form, the custom digital data entry form prompting the selected supplier to take action, respond, or contribute information back to the server computer;

receiving, by the server computer, information contributed by the selected supplier in response to the transmission of the e-mail message to the specified e-mail address of the selected supplier;

in response to receiving information contributed by the selected supplier, updating the supplier risk score value associated with the selected supplier identifier value based on the information contributed by the selected supplier;

in response to determining that the updated supplier risk score value associated with the selected supplier identifier value is above a threshold value, automatically approving the selected supplier in the e-procurement system;

in response to determining that the updated supplier risk score value associated with the selected supplier identifier value is below the threshold value, automatically rejecting the selected supplier from being onboarded in the e-procurement system;

wherein the method is performed by one or more computing devices.

10. The method of claim 9, wherein the existing supplier has already been onboarded during a supplier onboarding process in the e-procurement system.

11. A data processing system comprising:
one or more hardware processors;
a non-transitory computer-readable medium having instructions embodied thereon, the instructions, when executed by the one or more processors, cause:
receiving, by a server computer, a selection of a supplier identifier value that identifies a selected supplier during a supplier onboarding process in an e-procurement system;
querying, by the server computer, a digital data repository of the e-procurement system to seek a data record matching the selected supplier identifier value;
in response to determining that the data repository has a record matching the selected supplier identifier value, identifying a supplier risk score value associated with the selected supplier identifier value from a dataset of supplier risk score values that is stored in the data repository;
before the selected supplier is approved in the e-procurement system, generating in digital memory a unique mapping table that maps each supplier risk score value of one or more supplier risk score values to one or more information request identifiers of a plurality of information request identifiers, the one or more supplier risk score values including the supplier risk score value associated with the selected supplier identifier value, each information request identifier of the plurality of information request identifiers comprising a textual question or statement that indicates a request for information;
before the selected supplier is approved in the e-procurement system, generating, by the server computer, a custom digital data entry form comprising the one or more information request identifiers of the plurality of information request identifiers that are mapped to the supplier risk score value associated with the selected supplier identifier value in the unique mapping table;
digitally transmitting, by the server computer, to a specified e-mail address of the selected supplier, an e-mail message containing hyperlinks that invoke operation of the e-procurement system at a security sandboxed webpage, the security sandboxed webpage displaying the custom digital data entry form, the custom digital data entry form prompting the selected supplier to take action, respond, or contribute information back to the server computer;

receiving, by the server computer, information contributed by the selected supplier in response to the transmission of the e-mail message to the specified e-mail address of the selected supplier;

in response to receiving information contributed by the selected supplier, updating the supplier risk score value associated with the selected supplier identifier value based on the information contributed by the selected supplier;

in response to determining that the updated supplier risk score value associated with the selected supplier identifier value is above a threshold value, automatically approving the selected supplier in the e-procurement system;

in response to determining that the updated supplier risk score value associated with the selected supplier identifier value is below the threshold value, automatically rejecting the selected supplier from being onboarded in the e-procurement system.

12. The system of claim 11, further comprising:
in response to determining that the digital data repository does not include a record matching the selected supplier identifier, generating a supplier risk score value for the selected supplier identifier and storing the risk score value in a new record in the digital data repository that matches the selected supplier identifier.

13. The system of claim 11, wherein a supplier risk score value represents a risk that the supplier will default on a supply transaction and is calculated based on a plurality of data items that represent historic performance of the supplier.

14. The system of claim 11, wherein the supplier risk score value represents a risk that the supplier will default on a supply transaction and is calculated based on a financial score value that represents a rating of the supplier based upon financial indicators such as a third-party credit rating score value, a count of previous late payments, and/or a representation of whether the supplier has ever entered bankruptcy, a judicial score value that represents a number of lawsuits filed against the supplier, and a news sentiment score value that represents a sentiment value calculated by third-party sentiment calculation services based upon sentiments expressed in social media postings about the supplier.

15. The system of claim 11, further comprising: generating a unique mapping of each financial score value, judicial score value, and news sentiment score value to one or more information request identifiers, the financial score value, judicial score value, and news sentiment score value associated with the selected supplier.

16. A data processing system comprising:
one or more hardware processors;
a non-transitory computer-readable medium having instructions embodied thereon, the instructions, when executed by the one or more processors, cause:
receiving, by a server computer, a selection of a supplier identifier value that identifies an existing supplier in an e-procurement system;
querying, by the server computer, a digital data repository of the e-procurement system to identify a supplier risk score value associated with the selected supplier identifier value from a dataset of supplier risk score values that is stored in the data repository;
before the selected supplier is approved in the e-procurement system, generating in digital memory a unique mapping table that maps each supplier risk score value of one or more supplier risk score values to one or more information request identifiers of a plurality of information request identifiers, the one or more supplier risk score values including the supplier risk score value associated with the selected supplier identifier value, each information request identifier of the plurality of information request identifiers comprising a textual question or statement that indicates a request for information;

before the selected supplier is approved in the e-procurement system, generating, by the server computer, a custom digital data entry form comprising the one or more information request identifiers of the plurality of information request identifiers that are mapped to the supplier risk score value associated with the selected supplier identifier value in the unique mapping table;

digitally transmitting, by the server computer, to a specified e-mail address of the selected supplier, an e-mail message containing hyperlinks that invoke operation of the e-procurement system at a security sandboxed webpage, the security sandboxed webpage displaying the custom digital data entry form, the custom digital data entry form prompting the selected supplier to take action, respond, or contribute information back to the server computer;

receiving, by the server computer, information contributed by the selected supplier in response to the transmission of the e-mail message to the specified e-mail address of the selected supplier;

in response to receiving information contributed by the selected supplier, updating the supplier risk score value associated with the selected supplier identifier value based on the information contributed by the selected supplier;

in response to determining that the updated supplier risk score value associated with the selected supplier identifier value is above a threshold value, automatically approving the selected supplier in the e-procurement system;

in response to determining that the updated supplier risk score value associated with the selected supplier identifier value is below the threshold value, automatically rejecting the selected supplier from being onboarded in the e-procurement system.

17. The system of claim 16, wherein a supplier risk score value represents a risk that the supplier will default on a supply transaction and is calculated based on a plurality of data items that represent historic performance of the supplier.

18. The system of claim 16, wherein the supplier risk score value represents a risk that the supplier will default on a supply transaction and is calculated based on a financial score value that represents a rating of the supplier based upon financial indicators such as a third-party credit rating score value, a count of previous late payments, and/or a representation of whether the supplier has ever entered bankruptcy, a judicial score value that represents a number of lawsuits filed against the supplier, and a news sentiment score value that represents a sentiment value calculated by third-party sentiment calculation services based upon sentiments expressed in social media postings about the supplier.

19. The system of claim 16, further comprising: generating a unique mapping of each financial score value, judicial score value, and news sentiment score value to one or more information request identifiers, the financial score value, judicial score value, and news sentiment score value associated with the selected supplier.

20. The system of claim 16, wherein the existing supplier has already been onboarded during a supplier onboarding process in the e-procurement system.

\* \* \* \* \*